United States Patent
Darson-Balleur et al.

(10) Patent No.: US 8,210,776 B2
(45) Date of Patent: Jul. 3, 2012

(54) CALCIFICATION METHOD USING CALCIFYING BACTERIA

(75) Inventors: Sabine Darson-Balleur, Rueil Malmaison (FR); Olivier Girinsky, Rueil Malmaison (FR)

(73) Assignee: Soletanche Freyssinet, Rueil Malmaison (FR)

( * ) Notice: Subject to any disclaimer, the term of this patent is extended or adjusted under 35 U.S.C. 154(b) by 259 days.

(21) Appl. No.: 12/525,255

(22) PCT Filed: Jan. 30, 2008

(86) PCT No.: PCT/EP2008/051153
§ 371 (c)(1),
(2), (4) Date: Dec. 3, 2009

(87) PCT Pub. No.: WO2008/095848
PCT Pub. Date: Aug. 14, 2008

(65) Prior Publication Data
US 2010/0086367 A1    Apr. 8, 2010

(30) Foreign Application Priority Data

Jan. 30, 2007 (FR) .................................. 07 52968

(51) Int. Cl.
*E02D 3/12* (2006.01)
(52) U.S. Cl. .................. 405/302.4; 405/263; 405/302.6
(58) Field of Classification Search ............... 405/302.4, 405/302.6, 269, 263, 264, 258.1
See application file for complete search history.

(56) References Cited

U.S. PATENT DOCUMENTS

| | | | |
|---|---|---|---|
| 3,959,080 A | 5/1976 | Orth et al. | |
| 2008/0298901 A1 * | 12/2008 | Hamelin et al. | 405/264 |

FOREIGN PATENT DOCUMENTS

| | | |
|---|---|---|
| CA | 2 012 444 | 9/1990 |
| FR | 2 734 261 A1 | 11/1996 |
| FR | 2 873 725 A1 | 2/2006 |
| JP | 55-015703 A | 2/1980 |
| JP | 2004-215561 A | 8/2004 |
| WO | WO 2006/066326 A | 6/2006 |
| WO | WO 2006131611 A1 * | 12/2006 |

* cited by examiner

*Primary Examiner* — Frederick L Lagman
(74) *Attorney, Agent, or Firm* — Kenyon & Kenyon LLP (57) ABSTRACT

The invention relates to a method for improving the strength of a porous or permeable material. The invention particularly relates to a method comprising: contacting at least one type of calcification bacteria with a porous or permeable material; contacting the calcification bacteria with a calcification medium; said method or process further comprising: contact the calcification bacteria with an adhesion agent and the assimilation of the adhesion agent by the calcification bacteria. The invention can be used for reinforcing floors, in particular liquefiable floors, for the stabilization of slopes, for the calcification of non organic or organic substrates, and for the restoration or protection of a frontage.

20 Claims, 7 Drawing Sheets

FIG.1

CHEMICAL STRUCTURE OF INULIN

CALCIFICATION METHOD USING CALCIFYING BACTERIA

This is a 371 national phase application of PCT/EP2008/051153 filed 30 Jan. 2008, claiming priority to French patent application Ser. No. 07/52968 filed 30 Jan. 2007, the contents of which are incorporated herein by reference.

The invention relates to a method for improving the strength of a porous or permeable material, or bacterial calcification.

The invention relates in particular to a method for improving the strength of a porous or permeable material by biocalcification, advantageously while conserving the growth and/or the enzymatic activity of the bacteria used. This invention is more particularly intended for the consolidation of a soil, or of an inorganic or organic substrate, in particular such as a sand, a siliceous substrate and/or a calcareous substrate, for the restoration or protection of frontages, for the reinforcement of soils or for the stabilization of slopes, in particular in the context of combating building disasters in the event of earthquakes.

PRIOR ART

The bacterial precipitation of calcium carbonates is a well-known natural phenomenon: some bacteria, when metabolizing a carbonaceous substrate, produce an increase in carbonate and bicarbonate ions in the surrounding medium which, combined with calcium ions, lead to the precipitation of calcium carbonates.

This phenomenon is already used industrially for the restoration or protection of frontages (University Paris VI—CA 2012444), the reinforcement of soils or the stabilization of slopes (Murdoch University and Calcite Technology Pty Ltd-WO2006066326) or else the consolidation of liquefiable soils (Compagnie du Sol patent-FR2873725).

The use of bacteria in industrial processes, in particular for calcifying inorganic substrates, is carried out via aqueous phases. Most of the time, once the bacteria have been put in place, nutritive and/or reactive (calcifying) solutions are sprayed or injected so that the process can come to fruition. It is therefore important for the bacteria to be sufficiently well attached to the substrate to be treated so that the phases subsequently put in place do not move them or do not eliminate them. This attachment should go together with the maintaining of the enzymatic activity of the bacteria.

Industrial uses therefore run into a major problem which is the weak adhesion of the bacteria to the substrate to be treated. The consequence of this problem is a decrease in the degree of calcification and an increase in the calcification time, which induces a loss of competitiveness of the method compared with conventional restoration or reinforcement techniques.

Various techniques already propose to solve this problem by using either polymers of cellulosic or acrylic type (Seikatsu Bunkasha KK patent application JP2004215561, UBE industries patent JP55015703, and Merck Gmbh U.S. Pat. No. 3,959,080), or divalent ions (Murdoch University-WO2006066326). The drawbacks of these techniques are, respectively, the viscosification of the media owing to the development of long polymer chains, which is incompatible with good product penetration in soil injection processes, and the use of additional product volumes which make the process all the less financially viable.

OBJECTIVES OF THE INVENTION

The principal objective of the invention is to solve the technical problem consisting in providing a method for improving biocalcification processes.

The objective of the invention is also to solve the technical problem consisting in providing a method for improving the strength of a porous or permeable material.

The objective of the invention is also to solve the new technical problem consisting in providing a method for improving bacterial adhesion to a porous or permeable material, and in particular to a porous or permeable, inorganic or organic substrate, and in particular to a soil, such as a siliceous sand, for instance a Fontainebleau sand, a siliceous substrate and/or a calcareous substrate.

The objective of the invention is in particular to solve the technical problem consisting in improving the consolidation of a soil, or of an inorganic or organic substrate, in particular such as a sand, a siliceous substrate and/or a calcareous substrate, improving the restoration and/or protection of frontages, or improving the reinforcement of soils or the stabilization of slopes.

The objective of the invention is in particular to increase the adhesion of bacteria to the material or substrate to be treated, especially for improving bacterial calcification, in particular with the objectives indicated above.

The objective of the invention is to solve the various technical problems mentioned above, preferably by maintaining bacterial growth and/or bacterial enzymatic activity. In particular, the objective of the invention is to increase the enzymatic activity of calcifying bacteria and/or the growth of these bacteria.

The objective of the invention is in particular to solve the technical problems mentioned above by providing an improved process or method of bacterial calcification without any additional step, and/or without any increase in the amount or in the volume, and/or without any increase in the viscosity, of the fluids used.

Furthermore, the objective of the invention is also to provide a method or a process for increasing the degree of calcification and/or reducing the calcification time.

The objective of the invention is to solve these technical problems in the context of the injection of bacteria into the soil in order to improve the cohesion thereof and/or the strength thereof.

These technical problems should be solved reproducibly, industrially, as inexpensively as possible, advantageously without environmental toxicity, and preferably with the resistance to erosion and to pollution being improved, while at the same time maintaining a natural structure or the rock and/or the material reinforced or consolidated.

DESCRIPTION OF THE INVENTION

Thus, the present invention describes a method or process for improving the strength of a porous or permeable material, preferably a porous or permeable substrate, for instance a porous or permeable, inorganic and/or organic substrate, such as a soil, a rock, or a building material, comprising:

bringing at least one type of calcifying bacteria into contact with a porous or permeable material, bringing the calcifying bacteria into contact with a calcifying medium, said method or process comprising:

bringing the calcifying bacteria into contact with an adhesion agent, and assimilation of the adhesion agent by the calcifying bacteria, in particular in order to improve the strength of the porous or permeable material.

In the present invention, the expression "improving the strength of the porous or permeable material" is intended to mean: reinforcing or consolidating a porous or permeable material, improving or increasing the cohesion between the particles of a porous or permeable material, or improving or increasing the compressive strength of this material. It is preferable to use the method according to the standard on simple compressive tests (NF EN 12390-3) in order to verify the improvement of the strength of the porous or permeable material.

According to a first advantageous embodiment, the adhesion agent is added to the bacterial culture medium and/or to the inoculum, before or while the calcifying bacteria are brought into contact with the porous or permeable material.

According to a second advantageous embodiment, the adhesion agent is added to the calcifying medium before or while the calcifying bacteria are brought into contact with the calcifying medium.

According to a third advantageous embodiment, the adhesion agent is added to the culture medium and to the calcifying medium.

A calcifying bacterium is advantageously a bacterium which makes it possible to increase the carbonate and bicarbonate ions in the surrounding medium, in particular by metabolizing a carbonaceous substrate, so as to obtain the precipitation of calcium carbonates in the presence of calcium.

The preferred bacteria are those which use inulin among the assimilable carbon sources.

Advantageously, the calcifying bacterium is *Sporosarcina pasteurii*.

The adhesion agent enables the bacteria to improve the strength of the porous or permeable material, in particular by improving the adhesion of the bacteria to the material to be treated. Logically, this property is due to the production of a greater number of exopolysaccharides by the calcifying bacteria which assimilate the adhesion agent. This solution has the advantage of neither complicating the industrial process, nor making it longer or more expensive, while at the same time providing an improvement in calcification and in adhesion to the substrate.

Preferably, the adhesion agent does not modify the physical characteristics of the solutions used, in particular the viscosity.

The adhesion agent is preferably chosen so as not to decrease the enzymatic activity of the calcifying bacteria, and preferably has no environmental toxicity.

Preferably, the adhesion agent is assimilated by the bacterium without inhibiting the synthesis of urease.

A very advantageous adhesion agent is inulin.

Advantageously, the adhesion agent is chosen from the group constituted of Jerusalem artichoke, sweet potato, oyster-plant, leek, chicory, artichoke, onion, garlic, shallot, elecampane (*Inula helenium*), and any one of the mixtures thereof, these compounds being rich in inulin.

It is also possible to use any plant extract containing inulin, obtained in particular from all or part of the plants mentioned.

Chicory (*Cichorium intybus*) is preferably used since the proportion of inulin is high and this starting material is readily available in large amounts for use on the industrial scale, in particular for the present applications.

The inulin obtained from plants can be purified or fractionated so as to obtain fractions which are more or less concentrated in terms of inulin.

The adhesion agent can be used alone or in a composition known as an adhesion composition.

The adhesion agent can be added in several steps. Calcifying bacteria may, for example, be cultured in the presence of the adhesion agent and then the adhesion agent can then again be added at the moment or just before the calcifying bacteria are brought into contact with the porous or permeable medium.

Thus, the present invention also relates to an adhesion medium comprising an adhesion agent and a medium for culturing and/or a medium for calcifying at least one type of calcifying bacterium, such as, for example, *Sporosarcina pasteurii*.

Advantageously, this medium comprises an effective concentration of at least one adhesion agent for promoting the synthesis of exopolysaccharides by a calcifying bacterium that assimilates the adhesion agent, for instance *Sporosarcina pasteurii*.

Advantageously, the adhesion medium comprises an effective concentration of inulin of greater than 0 and less than 10 g/L, and preferably between 1 and 10 g/L, in the culture medium or in the inoculum, and preferably between 250 and 1000 mg/L in the calcification medium.

Advantageously, it has been discovered, surprisingly, that the combined addition of the adhesion agent and of at least one divalent ion salt makes it possible to obtain very good adhesion of the bacteria. This combined addition can be carried out simultaneously, or successively, i.e. adding the divalent ion salt to the culture medium, and/or the inoculum, and/or to the calcifying medium before and/or after the addition of the adhesion agent.

The divalent ion is advantageously chosen from calcium, magnesium, nickel and zinc ions, and any one of the combinations thereof.

The calcium ions are preferably added in the form of calcium nitrate, calcium chloride, or another calcium salt.

Preferably, this salt is soluble in the medium to which it is added. Divalent ion salts, and in particular calcium salts, can be combined so as to benefit from an advantageous effect.

Advantageously, the concentration of divalent ions, and in particular calcium or magnesium ions, is between 1 and 50 mM. Typically, 2 to 20 mM, for instance 10 mM, of calcium or magnesium salt can be added to the medium.

Thus, the method for improving the strength of a porous or permeable material advantageously comprises bringing the calcifying bacteria into contact with at least one divalent ion salt, and in particular calcium or magnesium salt.

Similarly, the adhesion medium of the present invention may comprise at least one divalent ion salt, and in particular calcium or magnesium salt.

According to one preferred embodiment, the calcifying bacteria are cultured in the presence of an adhesion agent, preferably comprising inulin, for instance chicory (for example, 1.5 g/L of chicory), and adhesion agent, preferably containing inulin, for instance chicory (for example, between 0.5 and 8 g/L, and typically 2 g/L), and a calcium or magnesium salt (for example, from 1 to 50 mM, and typically 10 mM) are added to the culture medium, at the moment the calcifying bacteria are brought into contact with a porous or permeable material, or slightly before.

The calcifying bacteria are provided with the nutrients necessary to ensure their survival. The nutritive solutions are standard solutions well known to those skilled in the art. They provide the calcifying bacteria with a source of organic carbon, of nitrogen, and of other elements essential for their physiological function. It is clearly understood that, if several types of calcifying bacteria are used, it may be necessary to use different nutritive solutions, corresponding to the needs of each type of bacteria.

By way of indication, an example of a culture medium for the calcifying bacteria is a medium containing complex sources of carbon, such as Columbia medium or a medium containing yeast extract.

The term "calcifying medium" is intended to mean a medium which makes it possible to generate $CaCO_3$ in the presence of calcifying bacteria. By way of indication, a calcifying medium for the calcifying bacteria is a medium containing urea and calcium.

The invention also relates to the use of at least one adhesion agent that can be assimilated by a calcifying bacterium, optionally in combination with at least one divalent ion salt, preferably chosen from calcium, magnesium, nickel and zinc ions, and any one of the combinations thereof, and more preferably chosen from calcium or magnesium ions, for improving the calcification of a porous or permeable, inorganic or organic substrate, such as a soil, for example a siliceous sand such as Fontainebleau sand, or a siliceous and/or calcareous substrate, through biotechnology, preferably using *Sporosarcina pasteurii*.

The present invention also relates to a composition for the consolidation of soils, comprising at least one type of calcifying bacteria and comprising an effective concentration of at least one adhesion agent for assimilation thereof by said calcifying bacteria, for instance *Sporosarcina pasteurii*, said composition optionally comprising a medium for culturing the calcifying bacteria, and/or optionally at least one divalent ion salt, preferably chosen from calcium, magnesium, nickel and zinc ions, and any one of the combinations thereof, and more preferably chosen from calcium or magnesium ions. The various embodiment variants are mentioned above.

The present invention relates to a method for reinforcement of a soil, in particular the consolidation of liquefiable soils, the stabilization of slopes, in particular in the context of combating building disasters in the event of earthquakes, the calcification of porous or permeable, inorganic or organic substrates, or the restoration or protection of frontages, said method implementing the method or process described above.

Advantageously, the substrate has a particle size essentially between 10 µm and 2 mm. This particle size corresponds to the size of the particles which do not pass through a screen having a mesh size of less than 10 microns, with the exclusion of the particles which do not pass through a screen having a mesh size of less than 2 mm. Preferably, the substrate comprises 80% of such particles, and more preferably all the particles correspond to this particle size. It is preferred, for example, to use a siliceous sand such as a Fontainebleau sand having particles with a size of between 50 and 500 microns (µm) (analysis by screening).

Advantageously, a first method for reinforcing the soil comprises:
injecting, into a porous or permeable material, an aqueous phase comprising at least one type of calcifying bacteria, and preferably *Sporosarcina pasteurii*, said calcifying bacteria having been cultured optionally in the presence of an adhesion agent that can be assimilated by the calcifying bacteria, and preferably in the presence of inulin,
activating the calcification by bringing the calcifying bacteria into contact with a calcifying aqueous phase comprising at least one adhesion agent that can be assimilated by the calcifying bacteria, and preferably inulin, and optionally at least one divalent ion salt, preferably chosen from calcium, magnesium, nickel and zinc ions, and any one of the combinations thereof, and more preferably chosen from calcium or magnesium ions.

Advantageously, another method for reinforcing the soil comprises:
injecting, into a porous or permeable material, an aqueous phase comprising at least one type of calcifying bacteria, and preferably *Sporosarcina pasteurii*, said calcifying bacteria having been cultured in the presence of an adhesion agent that can be assimilated by the calcifying bacteria, and preferably in the presence of inulin, and optionally at least one divalent ion salt, preferably chosen from calcium, magnesium, nickel and zinc ions, and any one of the combinations thereof, and more preferably chosen from calcium or magnesium ions;
activating the calcification by bringing the calcifying bacteria into contact with a calcifying aqueous phase optionally comprising at least one adhesion agent that can be assimilated by the calcifying bacteria, and preferably inulin, and optionally at least one divalent ion salt, preferably chosen from calcium, magnesium, nickel and zinc ions, and any one of the combinations thereof, and more preferably chosen from calcium or magnesium ions.

The method of reinforcing soils makes it possible in particular to reinforce fine or liquefiable soils having a very low permeability of the order of $10^{-5}$ m/s. The consolidation or the watertighting of such soils involves the injection of a solution of calcifying bacteria that can penetrate deeply into the soil via the culture medium.

For example, the calcifying bacteria are injected into the soil, by gravity or under pressure, by means of feed boreholes. Advantageously, the reinforcement method comprises a feed by circulation of the calcifying bacteria in an aqueous solution.

This circulation may be provided by means of feed boreholes, or pumping or uptake boreholes. These processes advantageously comprise means for controlling the change in the treatment in order to adjust the treatment. These techniques are in particular described in patent FR 2 873 725 B1 (Compagnie du sol).

In the figures.

Other objectives, characteristics and advantages of the invention will become clearly apparent to those skilled in the art after reading the explanatory description which refers to examples that are given only by way of illustration and that could not in any way limit the scope of the invention.

The examples are an integral part of the present invention and any characteristic appearing to be novel in relation to any prior art, based on the description taken as a whole, including the examples, is an integral part of the invention in terms of the function thereof and in terms of the generality thereof.

Thus, each example has a general scope.

Furthermore, in the examples, all the percentages are given by weight, unless otherwise indicated, and the temperature is expressed in degrees Celsius, unless otherwise indicated, and the pressure is atmospheric pressure, unless otherwise indicated.

EXAMPLES

Example 1

Screening for Sugars that can be Assimilated by a Calcifying Bacterium

To bring about the attachment of the bacteria to a substrate, certain biochemical pathways can be stimulated in order to synthesize exopolysaccharides (EPSs). EPSs are sugar polymers, the primary role of which is to facilitate the adhesion of bacteria by reducing the forces of interaction between the microorganism and its immediate environment (for example: solid substrate of Fontainebleau sand type).

The first step was to carry out a screening of the various sugars that exist, in order to identify that or those which is (are) assimilable and which stimulate EPS synthesis in *Sporosarcina pasteurii*, preferably without inhibiting urease synthesis.

For this, two types of API strips were used: API 20 E and API 50CH. These tests are in the form of microtubes containing dehydrated substrates and which are inoculated with a bacterial suspension. The reactions produced during the incubation period are reflected by spontaneous color changes or color changes that are revealed by adding reagents. The results are given in Table 1 below.

TABLE 1

Identification of the sugars that can be assimilated by *S. pasteurii* (CIP 66.21 Pasteur) using API strips. The positive notation (+) corresponds to a color change in the cupule due to a production of acid under anaerobic conditions or an assimilation reflected by growth of the microorganism.

| Tests | Components | Results |
|---|---|---|
| ONPG | 2-NITROPHENYL-BETA-D-GALACTOPYRANOSIDE for beta-galactosidase | − |
| ADH | L-arginine/ARGININE DIHYDROLASE | − |
| LDC | l-lysine/LYSINE DECARBOXYLASE | − |
| Odc | l-ornithine/ORNITHINE DECARBOXYLASE | − |
| CIT | Citrate/USE OF CITRATE | − |
| $H_2S$ | Sodium thiosulfate/PRODUCTION OF $H_2S$ | − |
| UREA | UREASE | +++ |
| TDA | TRYPTOPHAN DEAMINASE | − |
| IND | INDOLE PRODUCTION | − |
| VP | Na pyruvate/production acetoin | − |
| GEL | Gelatinase (gelatin) | − |
| GLU | D glucose/fermentation oxidation | − |
| MAN | D-mannitol/fermentation oxidation | − |
| INO | inositol//fermentation-oxidation | − |
| SOR | D-sorbitol/fermentation-oxidation | − |
| RHA | L-rhamnose/fermentation-oxidation | − |
| SAC | D-Saccharose/fermentation-oxidation | − |
| MEL | Amygdalin/fermentation-oxidation | − |
| ARA | L-arabiniose/fermentation-oxidation | − |
| OX | Cytochrome oxidase | − |
| GLY | Glycerol | |
| ERY | Erythritol | − |
| DARA | D-arabinose | − |
| LARA | L-arabinose | − |
| RIB | D-ribose | − |
| DXYL | D-xylose | − |
| LXYL | L-xylose | − |

TABLE 1-continued

Identification of the sugars that can be assimilated by *S. pasteurii* (CIP 66.21 Pasteur) using API strips. The positive notation (+) corresponds to a color change in the cupule due to a production of acid under anaerobic conditions or an assimilation reflected by growth of the microorganism.

| Tests | Components | Results |
|---|---|---|
| ADO | D-adonitol | − |
| MDX | Methyl beta d-xylopyranoside | − |
| GAL | D-galactose | − |
| FRU | D-fructose | − |
| MNE | D-Mannose | − |
| SBE | L-sorose | − |
| RHA | L-Rhamnose | − |
| DUL | Dulcitol | − |
| MDM | Methyl alpha d-mannopyranoside | − |
| MDG | Methyl alpha d-glucopyranoside | − |
| NAG | n-acetylglucosamine | − |
| ARB | Arbutin | − |
| ESC | Esculin iron citrate | − |
| SAL | Salcine | − |
| CEL | D-cellobiose | − |
| MAL | D-maltose | − |
| LAC | D-lactose | − |
| MEL | D-melibiose | − |
| TRE | D-trehalose | − |
| INU | Inulin | +++ |
| MLZ | D-melezitose | − |
| RAF | D-rafinose | − |
| AMD | Starch | − |
| GLYG | Glycogen | − |
| XLT | Xylitol | − |
| GEN | Gentiobiose | − |
| TUR | D-turanose | − |
| LYX | D-lyxose | − |
| TAG | D-tagatose | − |
| LFUC | L-fucose | − |
| DARL | D-arabitol | − |
| LARL | L-arabitol | − |
| GNT | Potassium glucoNaTe | − |
| 2KG | Potassium 2-ketogluconate | − |
| 5KG | Potassium 5-ketogluconate | − |

Figure 1:
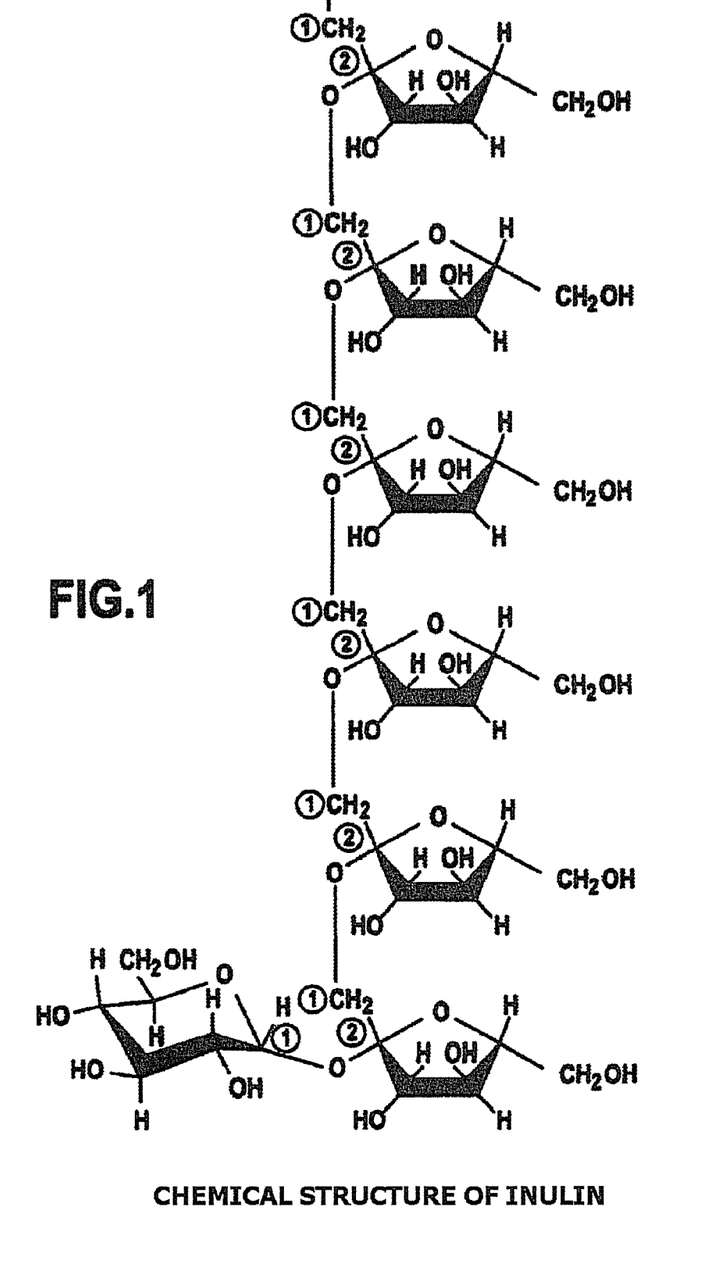
FIG. 1 represents the structure of inulin.

This analysis made it possible to identify inulin (structure given in FIG. 1) as carbon source that can be assimilated by *Sporosarcina pasteurii*. Moreover, the first tests carried out with inulin demonstrated adhesion of the bacteria to the laboratory glassware through the production of EPS. Inulin is naturally present in plants and especially in chicory (roots), which contains 78% thereof. For this reason, chicory will be used in the subsequent experiments.

Example 2

Improvement of the Growth of Calcifying Bacteria, and of EPS Synthesis in the Presence of Inulin in the Culture Medium In order to determine the amount of inulin necessary in order to act on the synthesis of urease and on the production of EPS in *Sporosarcina pasteurii*, a part of the nitrogenous carbon source (yeast extract) was replaced with chicory.

Both in the inoculum (20 g yeast extract+20 g urea, for 1 L of inoculum) and in the culture medium (10 g yeast extract+ 2.4 g urea+10 μM of $NiCl_2$+3 g of NaCl, for 1 L of culture medium), the substitution of ⅓ to ½ (by mass) of the yeast extract with chicory improved the attachment of the bacteria to the glassware, while at the same time maintaining or increasing the specific enzymatic activity of said bacteria.

Figure 2:
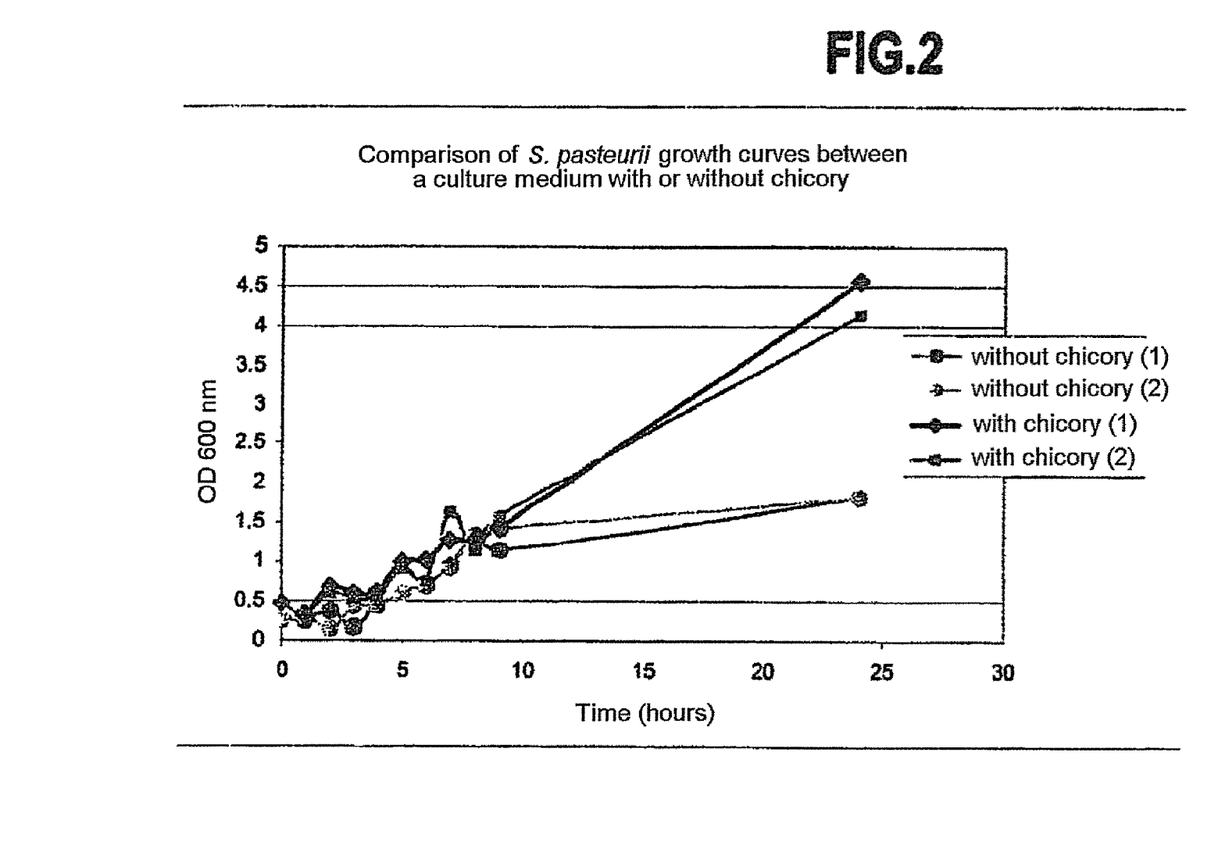
FIG. 2 represents the change in the growth of *Sporosarcina pasteurii* in a culture medium with or without chicory.

It is noted that the addition of inulin in the proportions mentioned above enabled a more rapid growth of the bacteria (FIG. 2).

The dosage of inulin recommended in the culture media is therefore between 0 and 10 g/L.

Example 3

Improvement of Adhesion of Calcifying Bacteria in the Presence of Inulin in the Culture Medium Inulin, in the form of chicory, was introduced into the culture media in order to demonstrate its influence on the adhesion of the bacteria with respect to the substrate to be treated. The chicory used is powdered extract of freeze-dried chicory, derived from the root of Cichorium intibus and sold under the trade name "Chicorée soluble Leroux". For this, two tests were carried out in parallel on columns:

The columns were made up of a PVC tube 63 mm in diameter and 200 mm in height, positioned between two PVC bases. One centimeter of filter sand was placed at the two ends and the whole of the column was made up with Fontainebleau sand tamped down under water by tapping. The Fontainebleau sand is the NE34-grade sand from SIFRACO. The injections were carried out from top to bottom.

The bacteria (Sporosarcina pasteurri—CIP 66.21 Pasteur) were cultured in two different culture media (1 L of laboratory water) containing 10 g of yeast extract, 2.4 g of urea, 10 µM of $NiCl_2$ and 3 g of NaCl, one of the media also containing 4 g/L of chicory. When the bacteria are in the exponential phase (OD>2.5), one porosity volume of this medium is injected into the columns with a percolation rate of 20 cm/h, and then left to react for 3 hours. The interstitial liquid is then flushed out and replaced with 2 porosity volumes of demineralized water at a percolation rate of 20 cm/h. All the experiments were carried out at 16° C.

Monitoring of the OD at the column outlet makes it possible to know the degree of attachment of the bacteria to the Fontainebleau sand. A calibration OD measurement was carried out beforehand on each of the media from which the bacteria were extracted in order to be free of differences in reading related to the medium itself. The difference in the inlet ODs between the media with and without chicory can be explained by the fact that the bacterial growth is greater in the presence of inulin.

Figure 4:
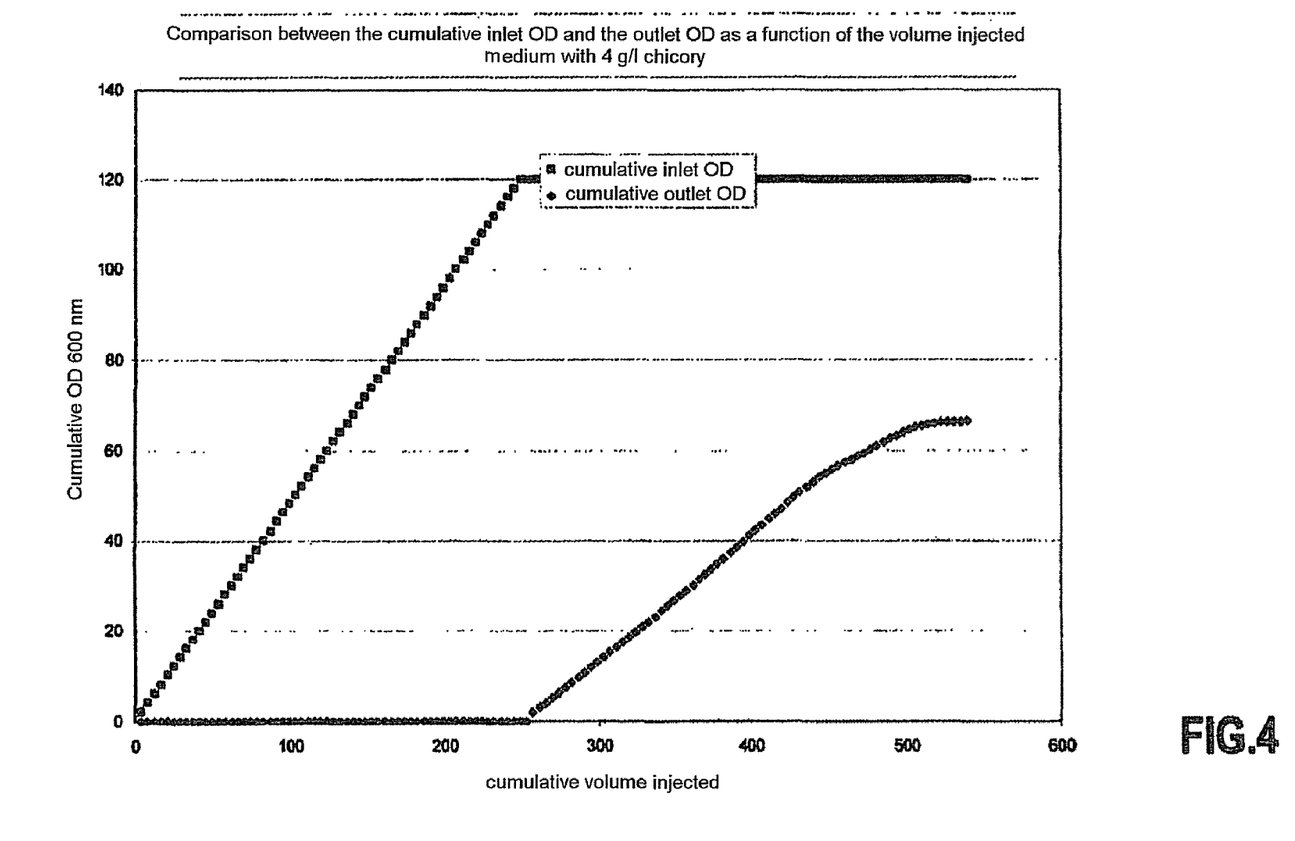
FIG. 4 compares the cumulative OD at the column inlet and at the column outlet, as a function of the volume injected, of a culture medium with 4 g/l of chicory according to Example 3.

Since the column porosity volume is 250 mL, the detection of the first bacteria at the column outlet is carried out after having injected 250 mL of culture medium. The graphic representation of the cumulative OD at the column inlet and at the column outlet makes it possible to readily visualize the degree of attachment of the bacteria to the granular substrate. Thus, an inlet OD of 2, measured every minute, gives a cumulative inlet OD of 120 after one hour of injection (FIG. 4). The outlet ODs are also measured every minute. The degree of attachment is calculated in the following way: degree of attachment=(final cumulative inlet OD−final cumulative outlet OD)/final cumulative inlet OD.

Figure 3:
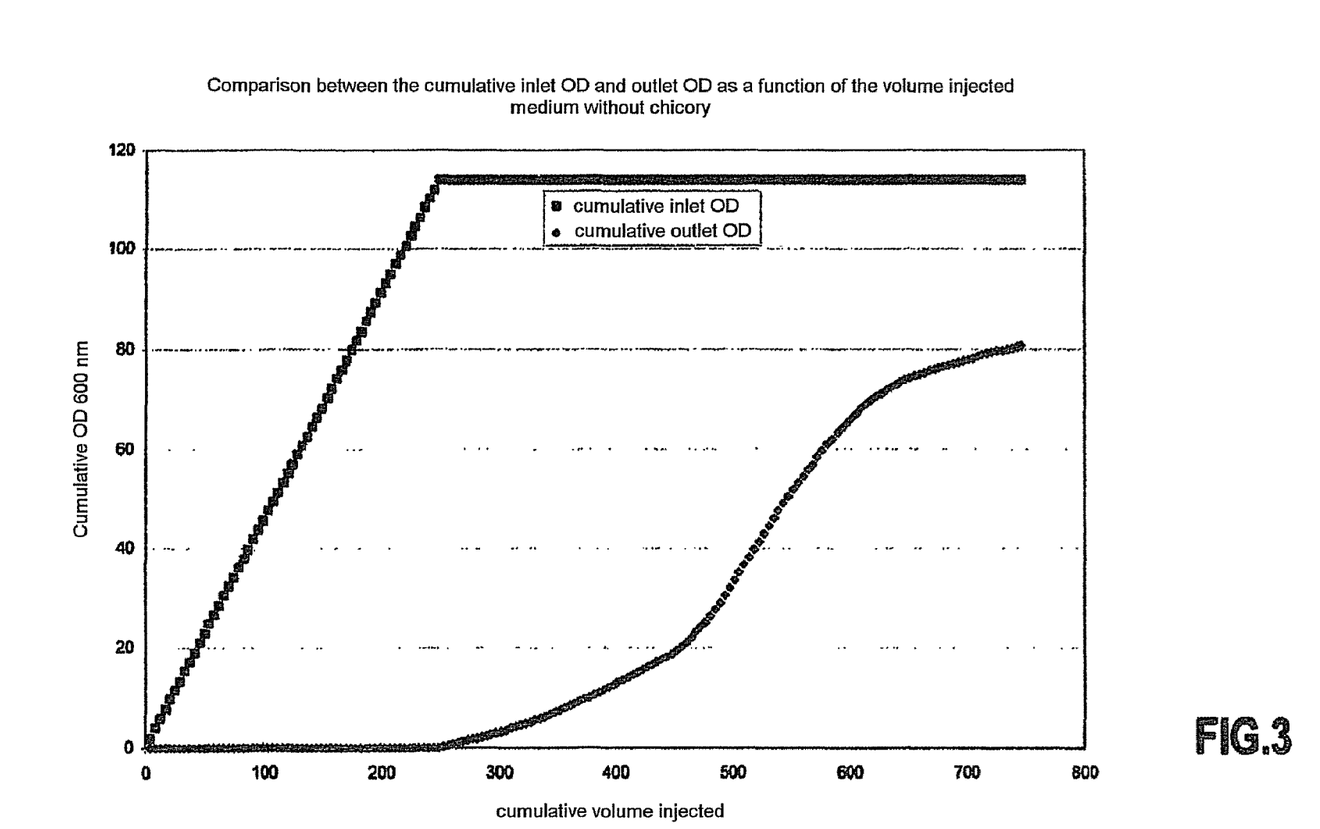
FIG. 3 compares the cumulative OD (optical density) at the column inlet and at the column outlet, as a function of the volume injected, of a culture medium without chicory according to Example 3.

FIGS. 3 and 4 compare the cumulative value of the column inlet OD and column outlet OD measurements, respectively without and with chicory in the culture medium. The test without chicory shows a degree of attachment of the bacteria of 30%, whereas the presence of chicory in the culture medium enables a 46% attachment of the bacteria.

Example 4

Improvement of the Adhesion of Calcifying Bacteria in the Presence of Inulin and of a Calcium Salt in the Culture Medium The action, on the bacterial adhesion, of inulin added to the culture medium in the form of chicory (see Example 3) can be reinforced by the presence of divalent ions.

4.1. Calcium Ions:

The columns were prepared in accordance with Example 3.

The bacteria (Sporosarcina pasteurii—CIP 66.21 Pasteur) were cultured in a culture medium (1 L of laboratory water) containing 10 g of yeast extract, 3 g of NaCl, 2.4 g of urea, 0.1 g of $MgCl_2$ and 0.0128 g of $NiCl_2$. When the bacteria are at the end of the exponential phase, the following are added to the culture medium:

either a source of calcium (10 mM $Ca(NO_3)_2$);
or chicory in a proportion of 4 or 8 g/L;
or a source of calcium (10 mM $Ca(NO_3)_2$) and chicory in a proportion of 4 or 8 g/L.

The whole was left to stir for one hour before being injected into the columns.

The injection conditions are identical to those of Example 3. All the experiments were carried out at 20° C.

Figure 5:
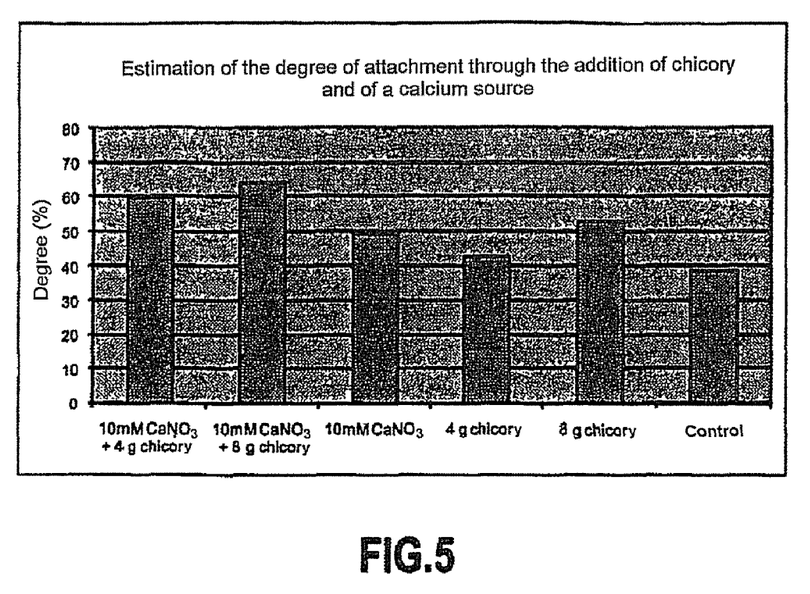
FIG. 5 represents a graph of the estimation of the degree of attachment through the addition of chicory and of a calcium source according to Example 4.

The cumulative column inlet and outlet OD values are compared and expressed in the form of percentage loss of OD, which represents the degree of attachment of the bacteria in the column. FIG. 5 represents the degrees of attachment of the bacteria stimulated by the addition of chicory, of calcium salt or of both to the culture medium before injection.

The results are summarized in Table 2 and FIG. 5:

TABLE 2

| | 10 mM $Ca(NO_3)_2$ + 4 g chicory | 10 mM $Ca(NO_3)_2$ + 8 g chicory | 10 mM $Ca(NO_3)_2$ | 4 g chicory | 8 g chicory | Control |
|---|---|---|---|---|---|---|
| Degree of attachment (%) | 60 | 64.3 | 49.5 | 43 | 53 | 39 |

The control without the addition of calcium salt or of supplementary chicory to the culture medium has a degree of attachment of 39%. The addition of chicory makes it possible to increase this degree of attachment, but the addition of chicory coupled with calcium nitrate makes it possible to significantly increase cell attachment values compared with a method without the addition of any adhesion agent. An effect of synergy between the chicory and the calcium salt is clearly reported here.

4.2. Magnesium Ions:

The protocol is identical to that of Example 4.1, with the calcium ions ($Ca(NO_3)_2$) being replaced with magnesium ions ($Mg(NO_3)_2$).

The results obtained show a similar synergy to that obtained with the calcium ions, in the presence of inulin.

Example 5

Improvement of Calcification in the Presence of Inulin in the Calcifying Medium

Inulin in the form of chicory was placed in the calcification media in order to determine its action on the calcification process. For this, two columns were prepared:

The columns were made up of a PVC tube 63 mm in diameter and 200 mm in height, positioned between two PVC bases. One centimeter of filter sand was placed at the two ends and the whole of the column was made up with Fontainebleau sand tamped down under water by tapping. The Fontainebleau sand is the NE34-grade sand from SIFRACO. The injections were carried out from top to bottom.

The bacteria (*Sporosarcina pasteurii*—CIP 66.21 Pasteur) were cultured in a culture medium (1 L of laboratory water) containing 10 g of yeast extract and 2.4 g of urea. When they were at the end of the exponential phase (OD>2.5), one porosity volume of this medium was injected into the columns with a flow rate of 85 mL/h, i.e. a percolation rate of 6.6 cm/h.

Five porosity volumes of calcifying medium ($CaCl_2$ and urea, equimolar at 0.5 M) were then injected with a flow rate of 60 ml/h in order to activate the calcification. In one of the columns, the calcifying medium was supplemented with 1 g/L of chicory.

Figure 6:
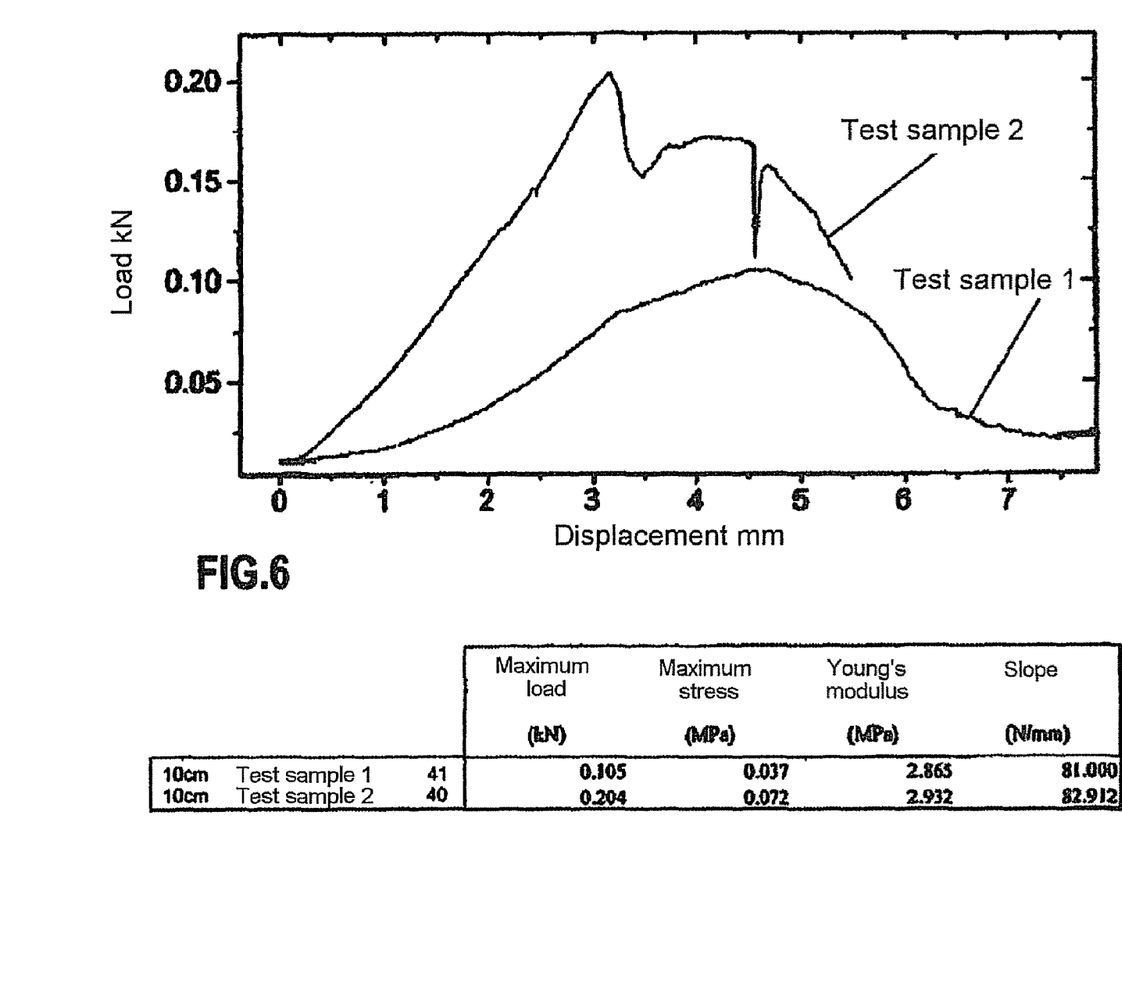
FIG. 6 represents the compressive strength of columns of Fontainebleau sand, inoculated with *Sporosarcina pasteurii* after reaction with the calcifying medium containing or not containing inulin.

The crushing performed on these two columns shows that the sample containing chicory has twice the compressive strength of the control sample (FIG. 6). It should be noted that, on the curve corresponding to the inulin-supplemented medium, the strength of the Fontainebleau sand is greater, which indicates better bacterial calcification. The breaks in slope are typical of the adhesion of the bacteria to the substrate. The compressive strength was measured according to the protocol of the NF EN 12390-3 standard.

Figure 7:
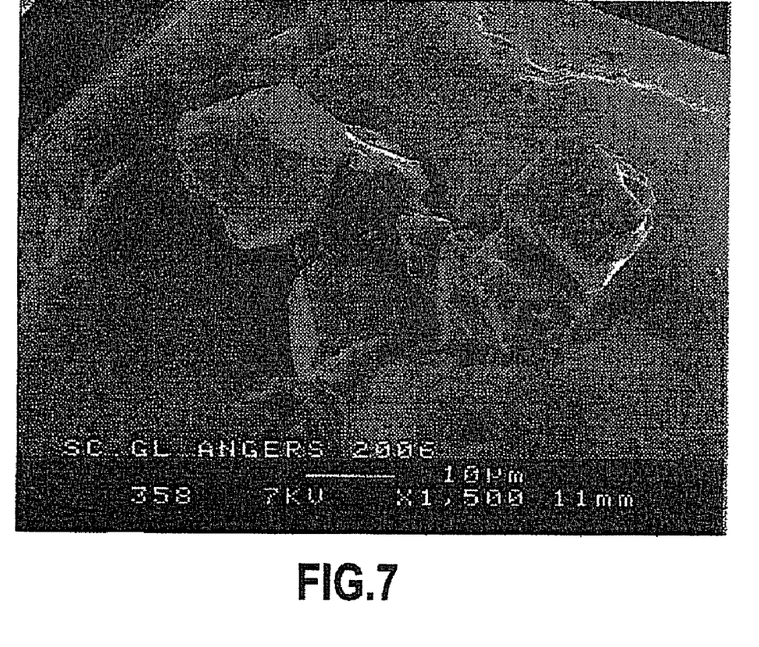
FIG. 7 is an SEM image of a sand biocalcified in the absence of inulin in the culture and calcification media.
Figure 8:
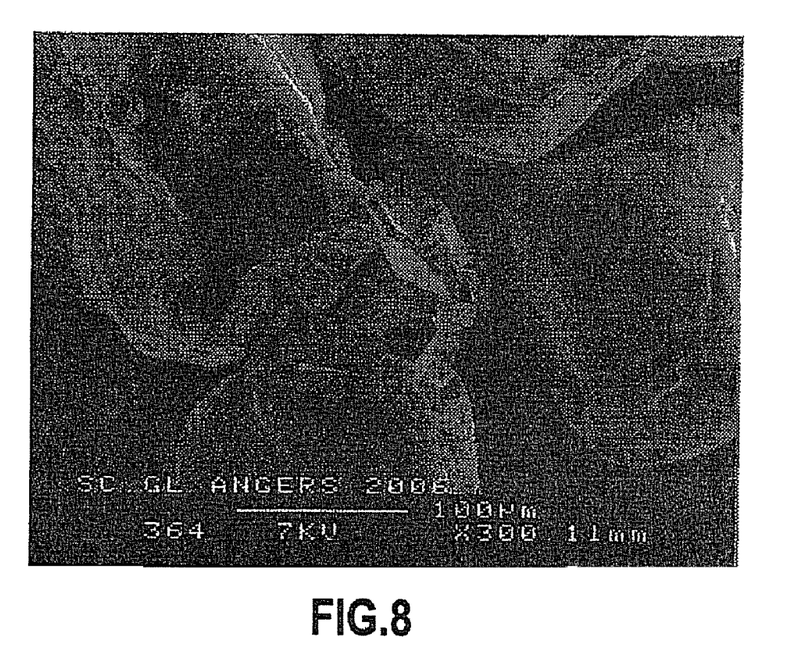
FIG. 8 is an SEM image of a sand biocalcified in the presence of inulin in the calcification medium.

The images produced by SEM (scanning electron microscopy) show that the neoformed crystals of calcite have sizes of approximately 10 μm in the absence of inulin in the culture and calcification media (FIG. 7), whereas this size increases to approximately 50 μm when the calcification medium contains inulin (FIG. 8). This difference in size of neoformed calcite could explain the differences in compressive strength values.

The invention claimed is:

1. A method for improving the strength of a porous or permeable material, said method comprising:
   bringing at least one type of calcifying bacteria into contact with a porous or permeable material;
   bringing the calcifying bacteria into contact with a calcifying medium;
   bringing the calcifying bacteria into contact with an adhesion agent, and assimilation of the adhesion agent by the calcifying bacteria,
   thereby improving the strength of said porous or permeable material.

2. The method of claim 1, wherein said adhesion agent is added to at least a bacterial culture medium or to an inoculum, before or while said calcifying bacteria are brought into contact with said porous or permeable material, or added to said calcifying medium before or while said calcifying bacteria are brought into contact with said calcifying medium, or added to a culture medium and to said calcifying medium.

3. The method of claim 1, wherein said calcifying bacteria are *Sporosarcina pasteurii*.

4. The method of claim 1, wherein said adhesion agent is selected from the group consisting of inulin or derivatives thereof, Jerusalem artichoke, sweet potato, oyster-plant, leek, chicory, artichoke, onion, garlic, shallot, elecampane (*Inula helenium*), and mixtures thereof.

5. The method of claim 1, wherein said method comprises bringing the calcifying bacteria into contact with at least one divalent ion salt.

6. The method of claim 5, wherein said divalent ion salt is a calcium salt.

7. The method of claim 6, wherein said calcium salt is calcium chloride, calcium nitrate, or a combination of calcium chloride and calcium nitrate.

8. The method of claim 1, wherein said method is a method for reinforcement of the soil or the restoration or protection of frontages.

9. A method for reinforcement of the soil, comprising:
   injecting, into a porous or permeable material, an aqueous phase comprising at least one type of calcifying bacteria;
   activating the calcification by bringing the calcifying bacteria into contact with a calcifying aqueous phase comprising at least one adhesion agent that can be assimilated by the calcifying bacteria.

10. The method of claim 9, wherein said calcifying bacteria are *Sporosarcina pasteurii*.

11. The method of claim 9, wherein said adhesion agent is inulin.

12. A method for reinforcement of the soil, comprising:
   culturing at least one type of calcifying bacteria in the presence of an adhesion agent that can be assimilated by said calcifying bacteria;
   injecting, into a porous or permeable material, an aqueous phase comprising the resulting cultured calcifying bacteria,
   activating the calcification by bringing the calcifying bacteria into contact with a calcifying aqueous phase.

13. The method of claim 12, wherein said calcifying bacteria are *Sporosarcina pasteurii*.

14. The method of claim 12, wherein said adhesion agent is inulin.

15. The method of claim 12, wherein the calcifying aqueous phase further comprises at least one adhesion agent that can be assimilated by the calcifying bacteria.

16. An adhesion medium comprising at least one of a culture medium and a calcification medium for at least one type of calcifying bacteria, and an effective concentration of at least one adhesion agent for promoting the synthesis of exopolysaccharides by calcifying bacteria that assimilates the adhesion agent.

17. The adhesion medium of claim 16, wherein said calcifying bacteria are *Sporosarcina pasteurii*.

18. The adhesion medium of claim 16, wherein the adhesion agent is inulin used at an effective concentration of greater than 0 and less than 10 g/L in the culture medium or in the inoculum, or in the calcification medium.

19. A composition for the consolidation of soils comprising at least one type of calcifying bacteria, wherein said composition comprises an effective concentration of at least one adhesion agent for assimilation thereof by said calcifying bacteria.

20. The composition of claim 19, wherein said calcifying bacteria are *Sporosarcina pasteurii*, and wherein said adhesion agent is inulin.

* * * * *